United States Patent [19]

Sandvig et al.

[11] Patent Number: 4,758,448

[45] Date of Patent: Jul. 19, 1988

[54] COATED OPHTHALMIC LENSES AND METHOD FOR COATING THE SAME

[75] Inventors: Timothy C. Sandvig, Woodville, Wis.; Dean A. Ersfeld, Maplewood; Eric P. Berg, Woodbury, both of Minn.

[73] Assignee: Signet Armorlite, Inc., San Marcos, Calif.

[21] Appl. No.: 739,885

[22] Filed: May 31, 1985

Related U.S. Application Data

[63] Continuation of Ser. No. 522,554, Aug. 15, 1983, Pat. No. 4,544,572, which is a continuation-in-part of Ser. No. 415,171, Sep. 7, 1982, abandoned.

[51] Int. Cl.$^4$ ............................................. B05D 3/06
[52] U.S. Cl. ...................................... 427/54.1; 427/164
[58] Field of Search ................ 427/44, 54.1, 133, 147, 427/162, 163, 164, 421, 425; 264/22; 118/323

[56] References Cited

U.S. PATENT DOCUMENTS

| | | | |
|---|---|---|---|
| 2,479,935 | 3/1947 | Johnson | 18/59 |
| 2,997,745 | 8/1961 | Kroeker | 18/55 |
| 3,955,035 | 4/1976 | Ito et al. | 428/334 |
| 3,968,305 | 7/1976 | Oshima et al. | 428/334 |
| 3,978,178 | 8/1976 | Oshima et al. | 264/25 |
| 4,041,120 | 8/1977 | Oshima et al. | 264/171 |
| 4,306,954 | 12/1981 | Wendling et al. | 204/159 |
| 4,308,119 | 12/1981 | Russell | 204/159 |
| 4,312,292 | 1/1982 | Smith et al. | 118/320 |

Primary Examiner—John H. Newsome
Attorney, Agent, or Firm—James V. Lilly; Allen H. Gerstein; Terrence W. McMillin

[57] ABSTRACT

An ophthalmic lens and a method for providing a thin coating thereon is disclosed. The coatings render the surfaces of the devices resistant to abrasion and have an SEB abrasion resistance to at least 20 psi. They are optically clear, aberration-free, and provide essentially exactly an optical surface having the desired surface configuration. The coating compositions employed contain reactive ethylenically unsaturated groups and are applied to a mold face and partially reacted. The coated mold is then used to cast the ophthalmic device.

11 Claims, No Drawings

COATED OPHTHALMIC LENSES AND METHOD FOR COATING THE SAME

CROSS-REFERENCE TO RELATED APPLICATION

This is a continuation of copending application Ser. No. 522,554 filed Aug. 15, 1983 and now U.S. Pat. No. 4,544,572, which was a continuation-in-part of copending application Ser. No. 415,171 filed Sept. 7, 1982 now abandoned.

TECHNICAL FIELD

This invention relates to coated ophthalmic lenses and to methods for applying coatings to such lenses. More particularly it relates to cast ophthalmic lenses, such as spectacle lenses, which have an optically clear, aberration free, abrasion-resistant coating applied thereto and to the methods of applying a coating by the application of a thin layer of a composition containing reactive ethylenically-unsaturated groups.

BACKGROUND ART

The application of coatings to surfaces is known. For example, U.S. Pat. Nos. 4,073,967 and 4,084,021 disclose the application of abrasion-resistant coatings to surfaces by spin coating, dip coating, spray coating, and flow coating techniques. While these techniques have been successful when used to coat smooth surfaces, such as the optical surface of single vision spectacle lenses, they have not been entirely satisfactory. For example, such techniques result in a build-up of a coating material at the outer edge of the lens which causes optical aberrations. Such techniques are even less satisfactory when they are used to coat irregular surfaces, such as those present on multivision ophthalmic devices, particularly those made from plastic. Such devices generally have segments which project abruptly away from (e.g. project above or below) at least one major optical surface of the device. Coating solutions applied to these optical surfaces by spin, dip, spray, or flow techniques must flow around and over these segments. The resulting coating generally exhibits flow marks around the projection and is thick at the intersections of the segment and the optical surface. This intersection is referred to hereinafter as the segment line.

Vapor coating techniques may also be employed. However, the resulting coatings tend to be very thin, for example 0.5 micron thick, and consequently are not useful in providing significant abrasion resistance.

U.S. Pat. No. 4,081,478 discloses a molding method wherein parts are first cast in a mold after which the mold is opened to provide a space for the injection of a predetermined quantity of coating composition. The mold is closed to spread the coating composition over the surface of the cast part, the coating cured in the closed mold, and the coated part removed from the mold. This technique is complicated and does not provide good adhesion of the coating to the substrate surface.

In yet another technique a gel coating material is applied to the surface of a mold and allowed to partially cure. See U.S. Pat. No. 4,081,578 at col. 2, lines 15–22. A mixture of resin compound and glass fibers is applied to and rolled over the gel coat. The resulting composite structure is allowed to cure. The purpose of this technique is to fill in any defects on the surface of an article.

U.S. Pat. No. 4,338,269 discloses a technique for applying a coating to the surface of a molded article. In this technique a composition containing a pentaerythritol base polyacrylate or polymethacrylate and a cellulose ester or a vinyl chloride-vinyl acetate containing polymer is applied to a mold and fully cured by exposure to actinic radiation. Subsequently a polymerizable composition is charged to the mold and polymerized. Such compositions exhibit only minimal abrasion resistance and have not been found to provide optically clear coatings.

U.S. Pat. No. 3,968,305 discloses a shaped article and a method for applying a "mar-resistant" layer thereto. One method disclosed in this patent involves the steps of first, applying to a mold a polymerizable material selected from
   (a) a compound having a total of at least three acryloxy and/or methacryloxy groups in the molecule which are linked with an aliphatic hydrocarbon residue having not more than 20 carbon atoms,
   (b) a monomer mixture comprising at least 20% by weight of said compound and at most 80% by weight of at least one other copolymerizable monomer, or
   (c) a partially polymerized product of said compound or said monomer mixture;
second, polymerizing the polymerizable material to form an abrasion-resistant film on the mold;
third, charging a monomer to the mold; and
fourth, polymerizing the monomer.

The article and method of the present invention do not require the formation of an abrasion-resistant film on the mold prior to introduction of the monomer. To the contrary such a technique would not work in the invention as is shown below.

DISCLOSURE OF THE INVENTION

The present invention provides an ophthalmic lens having a thin, optically clear, aberration free, abrasion-resistant coating on one or more of its optical surfaces. It further provides a method of applying a coating to ophthalmic devices such as spectacle lenses. The method is equally useful in applying a coating to single and multifocal lenses.

The ophthalmic device of the invention comprises an optically clear, solid, room-temperature stable substrate, prepared from a polymerized organic material. The device has at least one optical surface coated with a thin layer of an optically clear, aberration-free, abrasion-resistant coating. This coating comprises the polymerization product of a composition containing reactive ethylenically unsaturated groups and provides an SEB abrasion resistance of at least 20 pounds per square inch.

As used throughout this specification, the following terms have the following meanings:

(a) "Optically clear" means free from haze or other interference which prevents an object on one side of a lens from being seen clearly by an observer on the other side of a lens.

(b) "Aberration-free" means that an object on one side of a layer of the coated lens does not appear to be bent, twisted or distorted to a viewer on the other side of the lens.

(c) "Reactive ethylenically unsaturated groups" are those groups which polymerize, crosslink, or both when subjected to activating conditions described hereinafter.

(d) "Optical surface" means one of the surfaces which provides optical correction.

(e) "SEB abrasion resistance" is the abrasion resistance determined according to the technique described in U.S. Pat. No. 4,084,021. The value reported for SEB abrasion resistance refers to the level of force necessary to cause visible scratching on the coated surface of the lens.

The method of the invention comprises steps of:

applying a layer of a composition comprising a material containing reactive ethylenically unsaturated groups to at least a first face of a mold used to manufacture the ophthalmic device, wherein the first face is capable of imparting a desired optical configuration on a first optical surface of the ophthalmic device;

reacting the composition to a degree that it forms a dry film that is at least weakly adhered to the first face and exactly replicates the first face in an aberration-free manner;

filling the mold with an organic liquid material capable of hardening to a solid, room temperature-stable state; and hardening the liquid material so as to form the ophthalmic device and adhere the dry film to the first optical surface.

Coatings applied by the process of the invention are thin (typically having a thickness of from about 0.5 to 50, and preferably of from about 2 to 10, and more preferably of from about 3 to 5, microns thick). Furthermore, the coatings are free from surface aberrations due to nonuniformity of the thickness of the coating solution, flow marks, coating buildup, particularly at the segment lines and edges of the ophthalmic devices. Additionally, they exactly replicate the mold surface from which the ophthalmic device is made and consequently provide an optical surface having the desired surface configuration.

DETAILED DESCRIPTION

Molds used in the manufacture of ophthalmic devices from organic materials are generally made from glass or metal and typically have first and second mold sections which form the front and back optical surfaces on the devices. At least one of these sections has a surface which forms a finished optical surface.

The coating composition may be applied to one or more of the mold surfaces by a variety of techniques including spraying, dipping, brushing, flow coating, spin coating and the like. Flow coating has proven to be a very useful technique. In this technique a mold is preferably positioned such that the surface to be coated is oriented at an angle of from 45° to 60° from the horizontal. If the mold is designed for the production of multifocal devices having a straight segment line (such as a "flat top" lens), the face containing the multifocal portion is positioned so that the straight segment line is parallel to the vertical. In this position the outline of the multifocal portion of a common flat top bifocal lens mold forms the letter "D".

The molds are then preferably cleaned of particulate material by, for example, directing a stream of filtered nitrogen gas across the surface to be coated. A predetermined quantity of the composition is then applied to the top edge of the first face of the mold, preferably across an arc having a central angle of from about 140° to 160°. The composition is allowed to flow down to the bottom of the lens where any excess may be removed by an absorbent material placed in close proximity to the bottom of the die. If the composition includes a solvent, it may be, and preferably, is removed. This may be done by the use of infra-red radiation or heat.

The coating is then reacted to a degree that it forms a dry film on the mold which exactly replicates the mold face in an aberration-free manner. This may be done by either heating the composition for a time sufficient to form the dry film or by exposing it to activating radiation for a time sufficient to form the dry film. Whichever technique is employed, it is essential that the coating be partially reacted within certain limits. For example, if the coating is underreacted, it provides a hazy film and may also exhibit poor abrasion resistance. If, however the coating is overreacted, it exhibits unacceptable adhesion.

When thermal techniques are employed, the coating can be successfully partially reacted by exposing it to temperatures in the range of about 35° to 100° C. for from about one to ten minutes.

When activating radiation, such as ultraviolet light or electron beam radiation, is used, the coating is reacted until it exhibits a degree of unsaturation of from about 30% to 90% of the unsaturation it possessed prior to reaction. Preferably it is reacted until it exhibits a degree of unsaturation in the range of from about 40% to 75%, and most preferably from about 55% to 70%, of the unsaturation it possessed prior to reaction. Coatings which have a degree of unsaturation above about 90% provide a hazy film (i.e., one which is not optically clear) on the final device and may also exhibit poor abrasion-resistance while those which have a degree of unsaturation below about 30% exhibit unacceptable adhesion to the final product.

After being partially reacted, the coating is dry, although it may be tacky to the touch. Additionally, the coating will not flow by itself although it can be deformed by touching it with finger pressure. Furthermore, the coating is not abrasion-resistant at this point.

The specific technique used to bring about partial reaction may be selected to suit the nature of the coating composition. For example, when the reactive ethylenically unsaturated material contains acrylate-functional groups, a satisfactory level of reaction can be achieved by exposing the coating composition to ultraviolet light. While the exact exposure conditions employed are dependent upon the intensity of the light, the distance of the coating from the light, and final degree of unsaturation desired, satisfactory partial reaction may be achieved by positioning the coating at a distance of from 1 to 90 cm from the light and exposing it to radiation from a 40 watt/cm Hanovia lamp or from 0.02 sec to 40 min. Generally, the closer the coating is to the light source, the shorter the time of exposure.

If the ethylenically unsaturated materials contain alkoxy silane, the coatings can be satisfactorily reacted by the thermal techniques described above. Other techniques suitable for reacting the coatings will be obvious to those skilled in the art.

After the desired level of reaction is obtained, the mold is assembled and filled with liquid organic material to provide the substrate. A wide variety of thermosetting and thermoplastic organic materials can be employed. All that is necessary of such materials is that they be capable of solidifying to form a room-temperature stable, optically clear opthalmic device. Examples of useful thermosetting materials include allyl diglycol carbonate monomer, acrylate monomers, and acrylate oligomers. Examples of useful thermoplastic materials include polycarbonate, polymethylmethacrylate, polyvinyl chloride, and the like.

Once the mold is filled, the organic liquid is hardened by any suitable technique. For example, allyl diglycol carbonate may be hardened by subjecting it to heat in the range of 35° C. to 85° C. for up to 16 hours in the presence of a suitable polymerization agent.

As the organic liquid hardens, the film of coating composition forms an intimate bond to the substrate so that it adheres to the optical surface of the device more firmly than it adheres to the face of the mold. The coating is so intimately attached to the substrate that it can withstand repeated exposure to freeze/thaw cycles without any loss of adhesion. This is characteristic of a chemical bond between the two materials.

Additionally as the organic liquid hardens the coating is further reacted so that once hardening of the substrate is completed the coating has been rendered abrasion-resistant.

Once hardened the cast ophthalmic devices are removed from the mold. As the adhesion of the coating is greater to the surface of the ophthalmic device than it is to the face of the mold, it separates essentially completely from the mold. The resulting coating is thin and its exposed surface (that is the surface that formerly contacted the mold) provides exactly the optical surface desired on the ophthalmic device. Furthermore, it is free from aberrations such as would be caused by flow lines and buildup at segment lines which may be present.

The coated device may be used as is of alternatively it may be post reacted. Post-reaction may be accomplished by the same techniques utilized to initially react the coating. Typically the conditions employed during post curing are sufficient to assure essentially complete reaction of the coating. Suprisingly, post curing, even to a level such that there is essentially no available residual unsaturation remaining, does not adversely affect the adhesion of the coating to the cast article.

While the previous discussion has been directed to the application of the coating to only one surface of a multifocal ophthalmic device, the process may also be used to apply the coating to single vision lenses, particularly those having a high curvature, and to two or more surfaces of an ophthalmic device.

The articles of the invention exhibit a SEB abrasion resistance of at least 20 psi. This means that a force of at least 20 pounds per square inch must be applied to the coating to cause visible scratching. This level of abrasion resistance represents a substantial improvement over the abrasion resistance of uncoated lenses. For example lenses made from allyl diglycol carbonate monomer scratch visibly after the application of only 1 to 3 psi. Although an abrasion resistance of 20 psi represents a substantial improvement over this, it is only a fair or acceptable level of abrasion resistance in the context of the present invention. Thus, the lenses of the invention preferably exhibit an abrasion resistance of at least 40 psi (a good level of abrasion resistance) and more preferably exhibit an abrasion resistance of at least 60 psi (an excellent level of abrasion resistance).

The coating compositions useful in the invention contain at least one material having reactive ethylenically unsaturated groups. Example of such materials are acrylates, methacrylates, acrylic anhydrides, ethylenically unsaturated anhydrides, olefinic compounds, acrylamides, ethylenically unsaturated amides and urethanes, vinyl esters, vinyl ethers, vinyl halides, vinyl epoxy resins, vinyl silanes and siloxanes, vinyl heterocycles, melamines, and prepolymers and polymers of these materials. These materials may be mono- or polyfunctional.

Specific examples of these materials include methyl methacrylate, ethyl acrylate, 2-ethylhexyl acrylate, cyclohexyl acrylate, styrene, butadiene, 2-chlorostyrene, 2,4-dichlorostyrene, acrylic acid, acrylamide, acrylonitrile, t-butyl acrylate, methyl acrylate, butyl acrylate, N-vinyl pyrrolidone, 2-(N-butylcarbamyl)ethyl methacrylate, and 2-(N-ethylcarbamyl)ethyl methacrylate. Examples of other useful materials include 1,4-butylene dimethacrylate or acrylate, ethylene dimethacrylate, hexanediol diacrylate or dimethacrylate, glyceryl diacrylate or methacrylate, tripropylene glycol diacrylate, glyceryl triacrylate or trimethacrylate, pentaerythritol triacrylate or trimethacrylate, trimethylolpropane triacrylate, pentaerythritol tetraacrylate or tetramethacrylate, dimethylolpropane tetraacrylate, diallyl phthalate, dipentaerythritol pentaacrylate, dipentaerythritol hydroxypentaacrylate, neopentylglycol triacrylate and 1,3,5-tri(2-methacryloxyethyl)-s-triazine, hexamethoxymethyl melamine, poly(acrylic acid), a poly(methacrylic acid), poly(methyl methacrylate), poly(vinyl chloride), poly(vinyl acetate, poly(vinyl butyral) and the like.

A specific class of useful materials comprises the polyacrylate functional hydrocarbons having at least two acrylate groups per molecule. A preferred subclass of these materials are the poly(ethylenically unsaturated alkoxyalkyl) heterocyclic compounds having the general formula $$A^1-Z-A^2$$

in which (a) $A^1$ and $A^2$ independently are alkoxyalkyl groups having terminal ethylenic unsaturation and having the general formula

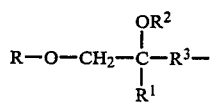

in which (1) $R^1$ is selected from hydrogen or methyl (2) R—O— is a monovalent residue (formed by removal of the active hydrogen from an —OH group) of an aliphatic terminally unsaturated primary alcohol, ROH, R having the formula

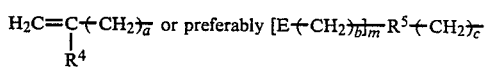

wherein E is selected from

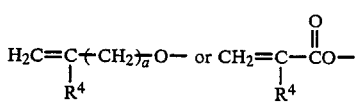

a and c are independently an integer of from 1 to 6, b is zero or an integer of 1 to 6, $R^4$ is selected from hydrogen or methyl, $R^5$ is an aliphatic group having 1 to 15 carbon atoms (preferably alkylene of up to 15 carbon atoms) and optionally one or two catenary (i.e., backbone) oxygen atoms or

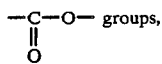

$R^5$ having a valence of m+1, and m is an integer of 1 to 5, (3) $R^2$ is preferably hydrogen but can be

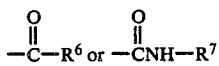

wherein $R^6$ is preferably alkenyl but can be alkyl (each preferably having 2 to 5 carbon atoms) and can be substituted by a phenyl or carboxyl group, and $R^7$ is an aliphatic group (of up to eight carbon atoms, e.g., alkyl) or aromatic group (preferably having up to 8 carbon atoms and more preferably a phenyl group) and $R^7$ is most preferably an acryloyloxyalkyl or a methacryloyloxyalkyl group;

(4) $R^3$ is an alkylene group having 1 to 6 carbon atoms and optionally one catenary oxygen atom; and (b) Z is a heterocyclic group of the formula:

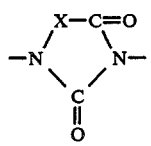

wherein X is a divalent group which is required to complete a 5- or 6-membered heterocyclic ring. Preferably X is

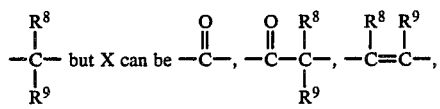

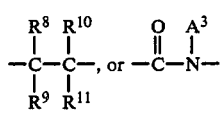

wherein $R^8$, $R^9$, $R^{10}$, and $R^{11}$ are independently hydrogen or lower alkyl (of 1 to 4 carbon atoms), cycloalkyl (of 3 to 6 carbon atoms) or phenyl group (of 6 to 12 carbon atoms), and $A^3$ is an alkoxyalkyl group as defined above for $A^1$ and $A^2$.

A specific heterocyclic compound of the generic formula is

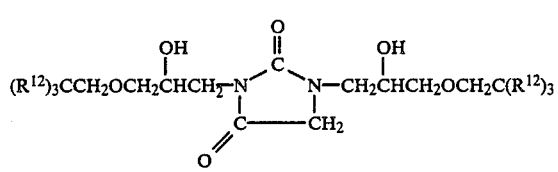

wherein $R^{12}$ is

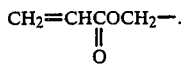

Materials of the formula $A^1$—Z—$A^2$ are disclosed in U.S. Pat. No. 4,306,954 incorporated herein by reference.

Other polyacrylate functional materials useful in the coating compositions include "Sartomer" 295 (pentaerythritol tetraacrylate) and "Sartomer" 399 (dipentaerythritol monohydroxy pentaacrylate) both commercially available from Sartomer Company. These materials respectively have the formulae

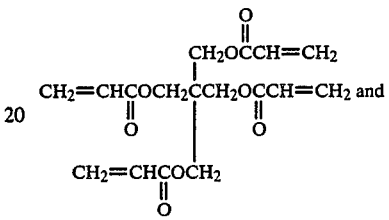

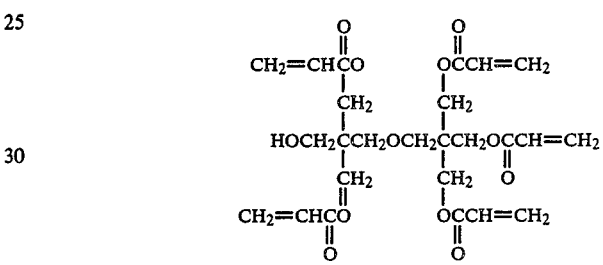

Other specific classes of useful ethylenically unsaturated materials include vinyl silane and siloxane materials and acryloxysilanes and siloxanes. Examples of such materials may be represented by the formula

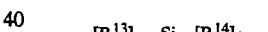

wherein $R^{13}$ is selected from a vinyl group, e.g.,

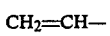

or a methacryloxy group, e.g.,

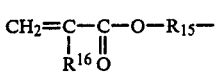

wherein $R^{15}$ is an alkylene group of 1 to 8 carbon atoms, and $R^{16}$ is hydrogen or hydrocarbyl radical of 1 to 8 carbon atoms (preferably alkyl). An epoxy group, such as one having of the following formulae

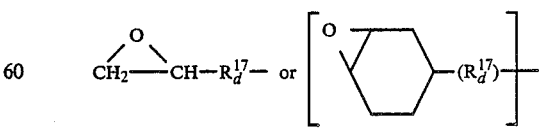

may be included in the silane or siloxane as the $R^{13}$ group provided that it does not constitute all of the $R^{13}$ groups. In these groups, $R^{17}$ is a divalent hydrocarbon radical (aliphatic-, aromatic-, or aliphatic- and aromatic-containing) of less than 20 carbon atoms or a divalent radical of less than 20 carbon atoms composed of C, H, N, S, and O atoms (these atoms are the only atoms which may appear in the backbone of the divalent radicals), the last being in the form of ether linkages. No two hetero atoms may be adjacent within the backbone of the divalent hydrocarbon radical. The value of d is 1, 2, or 3 and n is 1 or 2. $R^{14}$ is an oxyhydrocarbyl group, preferably alkoxy, acyl, or acetoxy, having 1 to 8 carbon atoms or a radical of formula $(CH_2CH_2O)_kZ$ in which k is an integer of at least 1 and Z is an aliphatic hydrocarbon radical of less than 10 carbon atoms or hydrogen. An oxyhydrocarbyl group is a hydrocarbon group or hydrocarbon group having no more than one heteroatom in the backbone selected from N, S, and O for every two carbon atoms in the backbone, wherein a hydrogen attached to a carbon atom has been replaced with a divalent oxygen atom to form an external bond. For example, starting with $CH_3CH_2OCH_3$, the oxyhydrocarbyl derivatives include $-O-CH_2CH_2OCH_3$. Exemplary hydrocarbyl groups include aromatic groups (e.g., phenyl, naphthyl and benzothienyl) and aliphatic groups (linear, branched, or cyclic) including cyclohexyl, tetrahydrofuryl, dioxanyl, peperidyl, pyrolidinyl, ethoxyethoxy ethyl, etc.). Preferably, this oxyhydrocarbyl group has 1 to 10 carbon atoms.

Examples of useful silanes are vinyltriethoxy silanes, vinyltris(2-methoxyethoxy)silane, vinyltriacetoxy silane, gamma-methacryloxypropyltrimethoxy silane, beta-(3,4,epoxycyclohexyl)ethyltrimethoxy silane and gamma-glycidoxypropyltrimethoxy silane. Other useful silanes of this type are known to the art. Combinations of silanes or additions of silanes and compounds copolymerizable with either functional group of the reactant (silane, epoxy, vinyl or methacryloxy) is contemplated in the practice of this invention. Preferably, however, the composition is free from amino silanes.

Two or more ethylenically unsaturated materials may, of course, be employed in the composition.

The composition preferably comprises at least about 5 parts by weight of the ethylenically unsaturated material. Most preferably it comprises from about 10 to 100 parts by weight of the ethylenically unsaturated material.

A reaction initiator may be incorporated into the coating composition. It comprises at least about 0.1 parts, and preferably from about 1 to 4 parts by weight of the ethylenically unsaturated material.

The nature of the reaction initiator utilized in the composition is dependant upon the ethylenically unsaturated material used. For example, for those ethylenically unsaturated materials which undergo free radical polymerization, suitable initiators are compounds which liberate or generate a free-radical on addition of energy. Such initiators include peroxy, azo, and redox systems each of which are well known and are described in polymerization art, e.g. Chapter 11 of *Photochemistry*, by Calvert and Pitts, John Wiley & Sons (1966). Included among free-radical initiators are the conventional heat activated catalysts such as organic peroxides and organic hydroperoxides. Examples of these catalysts are benzoyl peroxide, tertiary-butyl perbenzoate, cumene hydroperoxide, azobis(isobutyronitrile) and the like.

The preferred catalysts are photopolymerization initiators. Included among such initiators are acyloin and derivatives thereof, such as benzoin, benzoin methyl ether, benzoin ethyl ether, benzoin isopropyl ether, benzoin isobutyl ether, and α-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbmate; phenones such as acetophenone, α,α,α-tribromacetophenone, α,α-diethoxyacetophenone, α,α-dimethoxy-α-phenylacetophenone, o-nitro-α,α,α-tribromacetophenone, benzophenone, and p,p'-bis(dimethyliamino)benzophenone; aromatic iodonium and aromatic sulfonium salts, sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide, and p-acetamidobenzenesulfonyl chloride.

The reaction initiator employed with silane and siloxane materials is preferably a metal ester of the formula $M-(OR^{18})_x$, where M is selected from the group consisting of titanium, aluminum, and zirconium, $R^{18}$ is selected from the group consisting of lower alkyl radicals containing from 1 to 8 carbon atoms which are bonded to the oxygen atom, and x is equal to the number of valence bonds of M.

Other reaction initiators, such as acids or bases, may be used with silane and siloxane materials.

Representative metal esters which have been found useful in the practice of the present invention include tetraisopropyl titanate ("Tyzor", commercially available from DuPont); tetrabutyl titanate, tetraethyl titanate, tetra 2-ethylhexyl titanate, aluminum isopropoxide, aluminum n-butoxide, and tetraiosopropyl zirconate. Each of the metal esters may be utilized either by itself or in combination in the practice of the present invention. Other useful metal esters of the type described are known to the art. The preferred metal ester is tetraisopropyl titanate.

The coating compositions can include a variety of other ingredients such as compatible monomers and polymers, stabilizers, antioxidants, flexibilizers, colorants (e.g., dyes and pigments), reinforcing fillers, surfactants, flow aids, hardness enhancers (e.g., colloidal silica), and the like. Additionally, solvents may be utilized to facilitate preparation and application of the compositions. Examples of suitable solvents include methyl ethyl ketone, chloroform, methylene chloride and methyl alcohol.

The following examples further illustrate the present invention. Unless otherwise noted, all references to parts are to parts by weight.

EXAMPLE 1

A coating composition containing the following ingredients was prepared:

| | | parts |
|---|---|---|
| Part A | | |
| $CH_2CHCH_2O(CH_2)_3Si(OCH_3)_3$ with epoxy group | (1) | 75 |
| $CH_2=C(CH_3)CO(CH_2)_3Si(OCH_3)_3$ | (2) | 25 |
| Water | | 50 |
| Part B | | |
| Methyl Alcohol | | 65 |
| HCl (Concentrated) | | 4.7 |

| -continued | | |
|---|---|---|
| | | parts |
| Tetra isopropyl titanate | (3) | 28.4 |

(1) A-187 silane available from Union Carbide Corporation
(2) A-174 silane available from Union Carbide Corporation
(3) "Tyzor" available from DuPont Part A was prepared by combining the ingredients in a glass beaker at room temperature and stirring until a one-phase product was obtained. Part B was prepared by combining the ingredients in the order listed in a glass beaker at room temperature and stirring. Part A (12 g) and Part B (9 g) were then combined in a glass beaker with stirring at room temperature for about 15 minutes. A minor amount (0.5% by weight) of a fluorochemical surfactant ("FC-430" available from 3M Company) was added to the resultant product and stirring was continued for about 5 minutes.

The concave face of a single vision ophthalmic lens mold was coated with the resulting product by holding the mold at an angle of about 45 degrees from horizontal and painting a small quantity of the composition across the top edge of the concave face along an arc having a central angle of from 140° to 160°. The coating composition flowed downward across the face of the mold and left a thin, uniform, coating on the concave surface. The coating was partially reacted by placing the coated mold about 5 cm from a sunlamp and exposing it to ultraviolet light for two minutes at about 80° to 100° C.

The coated mold was then used to cast a single vision ophthalmic lens blank. Allyl diglycol carbonate monomer ("CR-39" from PPG Industries) containing 3% by weight benzoyl peroxide was charged to the mold until the mold was full. The filled mold was placed in a water bath and heated at 65° C. for one hour, 73° F. for one hour, and then at 85° C. for 15 hours. The temperature of the bath was then reduced to 60° C. and the resulting hardened lens removed from the mold.

The coating separated completely from the mold face upon removal of the lens from the mold and was firmly bonded to the convex surface of the lens. It could not be removed from the lens when tested according to ASTM D-3359 Tape Adhesion Test. Additionally, the coating exactly replicated the convex surface of the lens, was free from aberrations and had a SEB abrasion resistance of 30–40 psi. The coating was about 6 microns thick. The coating was subjected to postcuring by heating it for 8 hours at 85° C. After postcuring it had an SEB abrasion resistance of 70 psi.

EXAMPLE 2

A poly(ethylenically unsaturated alkyloxyalkyl)-heterocyclic compound of the formula

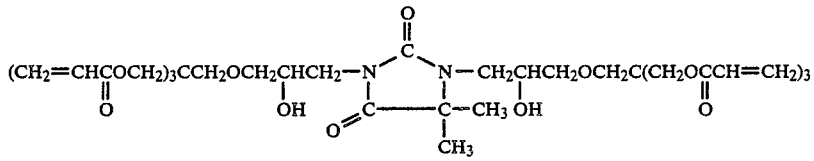

was prepared as described in U.S. Pat. No. 4,249,011 (Example 1). Sixty parts of the heterocyclic compound and 40 parts of methyl ethyl ketone were combined and mixed until uniform. A polymerization initiator (2% by weight of α,α-dimethoxy-α-phenylacetophenone ("Irgacure" 651 available from Ciba Geigy) was added to the mixture and stirred until a uniform composition was obtained. This composition was applied to the concave surface of a single vision ophthalmic lens mold as described in Example 1 to provide a thin coating thereon.

The methyl ethyl ketone was evaporated from the coating by allowing the coated mold to stand at room temperature for several minutes. The coating was then partially polymerized by exposing it to a 700 watt Hanovia medium pressure mercury arc lamp for 10 seconds at a distance of about 5 cm. The coated die was then used to prepare an ophthalmic lens blank as described in Example 1 using allyl diglycol carbonate monomer and 3% by weight benzoyl peroxide. The lens was cured as described in Example 1.

When the lens was removed from the mold, the coating separated essentially completely from the mold face and remained adhered to the lens surface. The coating was firmly bonded to the convex surface of the lens and could not be removed when tested according to ASTM D-3359 Tape Adhesion Test. The coating replicated the convex surface of the lens and was free from aberrations. The coated lens had a SEB abrasion resistance of 40–60 psi and was 10 to 12 microns thick. The coating was post cured by exposing it to ultraviolet light as described above. After post curing it had an SEB abrasion resistance of 90 psi.

EXAMPLE 3

A composition was prepared which contained 90 parts of the poly(ethylenically unsaturated alkoxyalkyl)heterocyclic compound described in Example 2, 10 parts of Silane "A-174", 2 parts α,α-dimethoxy-α-phenylacetophenone, and 508 parts by weight of methyl ethyl ketone. The composition was applied to the concave surface of a series of multivision ophthalmic lens molds as described in Example 1. After the solvent was evaporated, the coatings were partially polymerized by exposing them for five seconds to a 700 watt Hanovia medium pressure mercury arc lamp.

The coated dies were then used to prepare multivision ophthalmic lenses using the techniques described in Example 1. After curing and removal from the molds, the coatings separated completely from the mold faces and were firmly bonded to the convex surfaces of the lenses. They could not be removed from the lens surfaces when tested according to ASTM D-3359 Tape Adhesion Test. The exposed surfaces of the coatings exactly replicated the convex surface of the lenses and were free from aberrations. The lenses had a SEB abrasion resistance of 30–50 psi and were free from flow lines and coating buildup at the segment lines of the multivision segments. The coatings were from 4 to 5 microns thick.

The SEB abrasion resistance of the lenses was improved to 75 psi by post exposing them for 2 minutes to ultraviolet light from a 100 watt/in Hanovia Lamp positioned 10 cm from the coating. This did not affect the adhesion of the coatings to the lenses.

EXAMPLE 4

An ethylenically unsaturated material was prepared which had the formula:

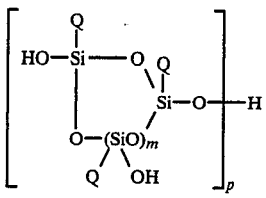

wherein Q is $CH_2=CH(CH_3)COO(CH_2)_3$, m had a value of between 3 and 8, and p had a value between from 2 to 10. The procedure used was as follows.

A 2 l. flask was placed in a heating mantle and fitted with reflux condenser, mechanical stirrer, and thermometer. The flask was charged with 1500 g of amber-colored gamma-methacryloxypropyltrimethoxysilane (available from Union Carbide as A-174 or from Dow Corning as Z-6030) and 150 g anhydrous sodium carbonate. The flask and contents were heated to about 130° C. and maintained at that temperature with stirring for 4 hours. The mixture was cooled to ambient temperature and filtered to remove the insoluble residue. The filtrate was returned to the flask together with about 2.25 g (0.15%) potassium hydroxide pellets. Stirring was maintained for 1 hour without heating as the liquid became very dark brown to black in color. The liquid was decanted and distilled under vacuum at 85° to 110° C. and 1 to 5 mm Hg pressure to yield water-white gamma-methacryloxypropyltrimethoxysilane.

A second flask was charged with 150 g of the above purified gamma-methacryloxypropyltrimethoxysilane, 150 ml of tetrahdrofuran (analytical reagent grade) 0.03 g butylated hydroxytoluene (as a stabilizer) and 33.6 g 1 normal hydrochloric acid. The mixture was refluxed for one hour and then evaporated in vacuum (45° C. at 5 mm Hg) to provide a residue of water-white clear oligomeric prepolymer of the above formula having a viscosity of about 11,000 cps after air-purging.

The prepolymer was combined with 2 parts by weight of α,α-dimethoxy-α-phenylacetophenone, warmed slightly, and applied as a thin coating to the concave surface of a multivision ophthalmic lens mold using the procedures described in Example 1. The coating was partially polymerized by exposing it for 2 seconds to ultraviolet light from a 100 watt/in Hanovia lamp located 10 cm from the coating. The mold was then used to prepare ophthalmic lenses from allyl diglycol carbonate monomer as described in Example 1 except that the lenses were heated in the water bath by slowly raising the temperature of the bath from 60° C. to 85° C. during a 12 hour period. When the lenses were removed from the mold, the coating separated completely from the mold faces and was firmly bonded to the convex surface of the lenses. It could not be removed from the lenses when tested according to ASTM D-3359 Tape Adhesion test. The coating replicated the convex surface of the lenses and was free from aberrations because the coatings were free from flow lines and coating buildup at the segment lines of the multivision segments. The lenses had an SEB abrasion resistance of 30–45 psi.

The abrasion resistance of the lenses was increased to 60 psi by post exposing the coatings for two minutes to ultraviolet from a 100 watt/in Hanovia lamp located 10 cm from the coating. This did not affect the adhesion of the coatings to the lenses.

EXAMPLE 5

A composition having the following ingredients was prepared:

| | Parts |
|---|---|
| Poly(ethylenically unsaturated alkoxyalkyl) heterocyclic compound of Example 2 | 60 |
| Pentaerythritol Tetraacrylate | 40 |
| "Irgacure" 651 | 3 |
| "FC-431" | 0.25 |
| Methylene Chloride | 896.75 |

This composition was applied to and partially reacted on a series of multivision ophthalmic lens molds using the methods described in Example 2. Various power levels were utilized during the exposure. The coated molds were then used to prepare ophthamic lenses from allyl diglycol carbonate as described in Example 1. The coated lenses were tested for residual unsaturation using infrared absorption techniques; SEB abrasion resistance and adhesion. The results of the abrasion resistance and the adhesion were reported as poor, fair, good and excellent. Poor (i.e., unacceptable) abrasion resistance meant that the coating visibly scratched with the application of less than 20 psi of force. Fair (acceptable) abrasion resistance meant that 20 to 40 psi of force were required before the coating visibly scratched. Good abrasion resistance means that 40 to 60 psi of force were required before the coating visibly scratched. Excellent abrasion resistance means that the coating either did not visibly scratch or visibly scratched only after the application of more than 60 psi of force. Poor (unacceptable) adhesion means that more than 10% of the coating was removed when tested according to the Tape Adhesion test ASTM D-3359. Good (acceptable) adhesion means that only from 5 to 10% of the coating was removed when tested according to ASTM D-3359. Excellent adhesion means that there was no coating removed when tested according to ASTM D-3359. The results of these tests are set out below.

| Sample | % Residual Unsaturation | Abrasion Resistance | Adhesion |
|---|---|---|---|
| A | 75 | Fair | Excellent |
| B | 67 | Excellent | Excellent |
| C | 62 | Excellent | Excellent |
| D | 57.1 | Excellent | Excellent |
| E | 55 | Excellent | Excellent |
| F | 48.3 | Excellent | Fair |
| G | 43 | Excellent | Fair |
| H | 36.1 | Excellent | Poor |
| I | 30.6 | Excellent | Poor |

EXAMPLE 6

Coating composition prepared as described in Examples 2, 3 and 5 were applied to the convex surfaces of ophthalmic lens molds using the coating technique described in Example 1. The coated molds were allowed to air dry at ambient room temperature for about one minute and then separate molds were partially cured by exposing them to a 300 watt/in. Hanovia medium pressure mercury lamp. The coatings were then tested for SEB abrasion resistance. The results are set out below.

| Coating Sol'n from Ex | % Residual Unsaturation | Abrasion Resistance (psi) |
| --- | --- | --- |
| 2 | 30 | <7.5 |
| 2 | 60 | <7.5 |
| 2 | 90 | <7.5 |
| 3 | 30 | <7.5 |
| 3 | 60 | <7.5 |
| 3 | 90 | <7.5 |
| 5 | 30 | <7.5 |
| 5 | 60 | <7.5 |
| 5 | 90 | <7.5 |

The coatings each had scratches so numerous that they became opaque.

EXAMPLE 7

A coating composition having the following ingredients was prepared:

| | Parts |
| --- | --- |
| $CH_2\overset{\displaystyle\diagdown\!\diagup}{\underset{O}{CH}}CH_2O(CH_2)_3Si(OCH_3)_3$ | 14.08 |
| $CH_2{=}\underset{\underset{CH_3}{\vert}}{\overset{\overset{O}{\|}}{C}}CO(CH_2)_3Si(OCH_3)_3$ | 4.7 |
| Deionized water | 7.74 |
| Methyl alcohol | 6.71 |
| HCl (37%) | .96 |
| Tetraisopropyl Titanate | 5.64 |
| Methyl ethyl ketone | 59.92 |
| Fluorochemical surfactant (FC-430) | 0.24 |

Clean glass and metal dies were flow coated with the above composition using the technique described in Example 1. The coated dies were allowed to stand at room temperature for about two minutes and then partially reacted for two minutes at 100° C. using an infrared heat lamp. Ophthalmic lenses were then cast from alkyl diglycol carbonate using the molds. The lenses were hardened by heating them at 48°–85° C. for 4½ hours. The lenses were removed from the mold, given a post cure at 90° C. for four hours and tested for SEB abrasion resistance and adhesion. The coating had an SEB abrasion resistance of 70 psi and 100% adhesion to the lens.

EXAMPLE 8

Two separate coating solutions having the following ingredients were prepared:

| | Parts |
| --- | --- |
| Solution A | |
| $CH_2\overset{\displaystyle\diagdown\!\diagup}{\underset{O}{CH}}CH_2O(CH_2)_3Si(OCH_3)_3$ | 18.78 |
| Deionized water | 7.74 |
| Methyl Alcohol | 6.71 |
| HCl (37%) | 0.96 |
| Tetraisopropyl titanate | 5.64 |
| Methyl ethyl ketone | 59.92 |
| Fluorocarbon surfactant (FC-430) | 0.24 |
| Solution B | |
| Poly(ethylenically unsaturated | 6 |

| | Parts |
| --- | --- |
| alkoxyalkyl)heterocyclic compound of Example 2 | |
| Pentaerythritol Tetraacrylate | 4 |
| Photoinitiator (Irgacure ® 651) | 0.3 |
| Fluorocarbon surfactant (FC-431) | 0.03 |
| Methylene Chloride | 89.67 |

Solution A was flow coated directly onto primed trifocal lenses and then partially cured using a 200 watt-/in. medium pressure lamp (1 pass, 0.25 joule/cm$^2$). The lenses were then post cured at 177° F. for 12 hours.

Trifocal lenses coated with solution B were prepared using the techniques described in Example 1 except that the coated molds were partially cured using a 200 watt-/in. medium pressure lamp and exposing the molds to only one pass at 0.25 joules/cm$^2$. The filled molds were heated to 48°–85° C. for seven hours to cure the lenses. The cured lenses were removed from the molds and post cured using a 300 watt/in medium pressure lamp and exposing them to four passes at 1 joule/cm$^2$.

A Ronchi Graph was used to test the aberration of the coated surfaces. The trifocal lenses coated with Solution A all exhibited aberrations around the segments while the trifocal lenses coated with Solution B did not exhibit aberrations.

EXAMPLE 9

Four coated ophthalmic lenses were prepared using the coating solution of Example 5. The coating solutions were applied and partially cured as described in Example 1 except that a level of 0.25 joules/cm$^2$ were used for partial curing. After the lenses had been hardened, the coatings wee exposed to 4 joules/cm$^2$. The coatings had 100% adhesion to the lenses.

The coated lenses were dipped into a 93° C. water bath for 10 minutes, removed and immediately dipped into a 2° C. ice/water bath for 10 minutes. This cycle was repeated 5 times.

The coatings were then tested for coating adhesion and found to have 100% adhesion to the lenses.

What is claimed is:

1. A curved ophthalmic lens having an SEB abrasion resistance of at least 20 psi and providing refraction of light comprising
   an optically clear, solid, room-temperature stable substrate, and
   an optically clear, aberration-free, abrasion-resistant coating intimately bonded to said substrate, said coating providing essentially exactly an optical surface of desired configuration, said coating comprising the polymerization product of a composition containing reactive ethylenically unsaturated groups, wherein said coating exhibits an adhesion of at least 90% to said substrate when tested according to ASTM D-3359.

2. A lens according to claim 1 wherein said material containing reactive ethylenically unsaturated groups is selected from the group consisting of acrylates, methacrylates, acrylic anhydrides, ethylenically unsaturated anhydrides, olefinic compounds, acrylamides, ethylenically unsaturated amides and urethanes, vinyl esters, vinyl ethers, vinyl halides, vinyl epoxy resins, vinyl silanes, vinyl siloxanes, vinyl heterocycles, melamines, poly(ethylenically unsaturated alkoxyalkyl) compounds, blends, polymers, and copolymers thereof.

3. A lens according to claim 2 wherein said material containing reactive ethylenically groups is a poly(ethylenically unsaturated alkoxyalkyl) compound of the formula $A^1$—Z—$A^2$ wherein (a) $A^1$ and $A^2$ are independently groups having terminal ethylenic unsaturation said groups having the formula:

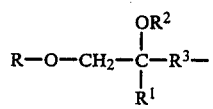

in which (1) $R^1$ is selected from hydrogen or methyl
(2) R—O— is a monovalent residue of an aliphatic terminally unsaturated primary alcohol, ROH, where R is selected from the formulae

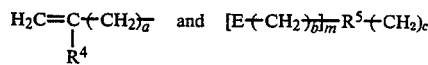

wherein E is selected from the formulae

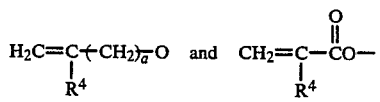

a and c are independently integers of from 1 to 6, b is zero or an integer of from 1 to 6, $R^4$ is selected from hydrogen or methyl, $R^5$ is an aliphatic group having 1 to 15 carbon atoms which may be interrupted with up to two groups selected from the class consisting of ether oxygen or

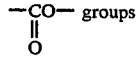

$R^5$ having a valence of m+1 wherein m is an integer of 1 to 5, (3) $R^2$ is selected from the group of hydrogen,

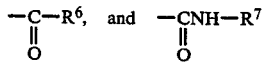

wherein $R^6$ is selected from alkyl and alkenyl groups having up to 5 carbon atoms, $R^7$ is an aliphatic group of up to 8 carbon atoms or an aromatic group of up to 8 carbon atoms, (4) $R^3$ is an alkylene group having 1 to 6 carbon atoms and up to one catenary oxygen in the group, and (b) Z is a heterocyclic group of the formula:

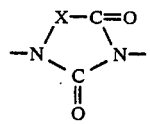

wherein X is a divalent group required to complete a 5-membered heterocyclic ring and is selected from the group of

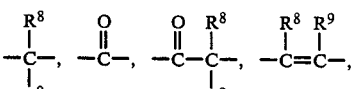

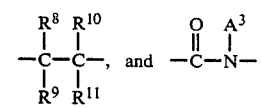

wherein $R^8$, $R^9$, $R^{10}$, and $R^{11}$ are independently selected from hydrogen, alkyl groups of 1 to 4 carbon atoms, cycloalkyl groups of 3 to 6 carbon atoms, and phenyl groups, and $A^3$ is the same as $A^1$.

4. A lens according to claim 2 wherein said composition further includes a reaction initiator.

5. A lens according to claim 2 wherein said composition further includes one or more materials selected from the group consisting of polymers, stabilizers, antioxidants, flexibilizers, colorants, fillers, surfactants, flow aids, and hardness enhancers.

6. A lens according to claim 1 wherein said ophthalmic lens comprises a spectacle lens.

7. A lens according to claim 1 wherein said coating is chemically bonded to said substrate.

8. An ophthalmic lens according to claim 1 wherein said spectacle lens provides corrective refraction of light passing therethrough.

9. A lens according to claim 8 wherein said spectable lens comprises a multifocal spectacle lens.

10. A curved ophthalmic lens for correction of vision comprising an optically clear, solid, room temperature stable substrate bearing an aberration-free coating which provides an optical surface which comprises essentially exactly the positive replicate of a lens mold and which has an SEB abrasion resistance of at least 20 psi, which coating comprises the polymerization product of a composition containing reactive ethylenically unsaturated groups, and which has an adhesion of at least 90% to said substrate when tested according to ASTM D-3359.

11. A lens according to claim 9 having a segment line thereon.

* * * * *

REEXAMINATION CERTIFICATE (2173rd)

United States Patent [19]

Sandvig et al.

[11] B1 4,758,448

[45] Certificate Issued  Jan. 4, 1994

[54] COATED OPHTHALMIC LENSES AND METHOD FOR COATING THE SAME

[75] Inventors: Timothy C. Sandvig, Woodville, Wis.; Dean A. Ersfeld, Maplewood; Eric P. Berg, Woodbury, both of Minn.

[73] Assignee: Signet Armorlite, Inc., San Marcos, Calif.

Reexamination Request:
No. 90/002,786, Jul. 17, 1992

Reexamination Certificate for:
Patent No.: 4,758,448
Issued: Jul. 19, 1988
Appl. No.: 739,885
Filed: May 31, 1985

Related U.S. Application Data

[63] Continuation of Ser. No. 522,554 Aug. 15, 1983, Pat. No. 4,544,572, which is a continuation-in-part of Ser. No. 415,171, Sep. 7, 1982, abandoned.

[51] Int. Cl.[5] ............... B05D 3/06; B05D 5/06; G03B 1/00; B29D 11/00
[52] U.S. Cl. .................. 351/166; 351/168; 351/177; 427/492; 427/493; 427/508; 427/514; 427/164; 264/22; 264/1.4; 264/1.7; 264/1.8
[58] Field of Search ............ 427/492, 493, 508, 515, 427/514, 164; 264/22, 1.4, 1.7, 1.8; 351/166, 168, 177; 359/643, 646

[56] References Cited

U.S. PATENT DOCUMENTS

| | | |
|---|---|---|
| 2,479,935 | 8/1949 | Johnson . |
| 2,997,745 | 2/1961 | Kroeker ............ 18/55 |
| 3,038,210 | 7/1962 | Hungerford et al. ............ 18/58 |
| 3,171,869 | 3/1965 | Weinberg ............ 264/1 |
| 3,364,291 | 1/1968 | Deichert et al. ............ 264/255 |
| 3,465,076 | 9/1969 | Yokohama et al. ............ 264/255 |
| 3,518,341 | 6/1970 | Haryu ............ 264/255 |
| 3,844,916 | 10/1974 | Gaske ............ 204/159.16 |
| 3,914,165 | 10/1975 | Gaske ............ 204/159.15 |
| 3,925,349 | 12/1975 | Gaske ............ 204/159.15 |
| 3,955,035 | 5/1976 | Ito et al. ............ 428/334 |
| 3,968,305 | 7/1976 | Oshima et al. ............ 428/334 |
| 3,978,178 | 8/1976 | Oshima et al. ............ 264/25 |
| 3,989,609 | 11/1976 | Brack ............ 204/159.15 |
| 4,014,771 | 3/1977 | Rosenkranz et al. ............ 204/159.23 |
| 4,041,120 | 8/1977 | Oshima et al. ............ 264/171 |
| 4,073,967 | 2/1978 | Sandvig ............ 427/44 |
| 4,084,021 | 4/1978 | Sandvig ............ 427/164 |
| 4,199,421 | 4/1980 | Kamada et al. ............ 204/159.22 |
| 4,273,799 | 6/1981 | Kamada et al. ............ 427/44 |
| 4,306,954 | 12/1981 | Wendling et al. ............ 204/159.22 |
| 4,319,811 | 3/1982 | Tu et al. ............ 351/166 |
| 4,338,269 | 7/1982 | Russell ............ 264/22 |
| 4,435,476 | 3/1984 | Phillips et al. ............ 427/525 |

FOREIGN PATENT DOCUMENTS

| | | |
|---|---|---|
| 52-114628 | 9/1977 | Japan . |
| 52-126474 | 10/1977 | Japan . |
| 630026 | 10/1949 | United Kingdom . |
| 889486 | 2/1962 | United Kingdom . |
| 1600613 | 10/1981 | United Kingdom . |

OTHER PUBLICATIONS

Dialog File 16: PTS PROMT, Entry Numbers: 00427575, Gentex Corp's, news release Jun. 9, 1978, p.1; 00806352, Chemical Business, Jun. 28, 1982 p. 5; 00492943, (General Electrics) Journal of Commerce, Jun. 28, 1979, p. 5; 00679332, (General Electrics) American Paint & Coating Journal Sep. 28, 1981, p. 56; 01010014, (Gaf) Manufacturing Chemist & Aersol News Sep. 1983, p. 23; 00273907, (Berg Industries) Modern Plastics, Oct. 1973, p. 37; 00455988, (AO Safety Prod) Financial Times (London Ed.) Nov. 20, 1978, p. 7; 00964,759, (BMC Indust, & Walman Optical) Chemical Marketing Reporter; Nov. 7, 1983, p. 67.

Dialog File 47: Magazine Index 01968847: "Out, Out dammed scratch!" Popular Science, Fisher, V.219, p. 23 Jul. 1981.

Plastics World, Jul. 1982 "Meeting The High-Treat Challenge Engineering Plastics" pp. 36–42.

European Patent Office, Decision of the Technical Board of Appeal 3.4.2, Jun. 16, 1993, pp. 1–18.

Board of Appeal of the European Patent Office, Minutes of the public oral proceedings before the Technical Board of Appeal 3.4.2 of Mar. 16, 1993, Mar. 25, 1993.

Primary Examiner—Marianne L. Padgett

[57] ABSTRACT

An ophthalmic lens and a method for providing a thin coating thereon is disclosed. The coatings render the surfaces of the device resistant to abrasion and have an SEB abrasion resistance to at least 20 psi. They are optically clear, aberration-free, and provide essentially exactly an optical surface having the desired surface configuration. The coating compositions employed contain reactive ethylenically unsaturated groups and are applied to a mold face and partially reacted. The coated mold is then used to cast the ophthalmic device.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2–9 and 11, dependent on an amended claim, are determined to be patentable.

New claims 12–14 are added and determined to be patentable.

1. A curved ophthalmic lens having an SEB abrasion resistance of at least [20] *40* psi and providing refraction of light comprising
    an optically clear, solid, room-temperature stable substrate, and
    an optically clear, aberration-free, abrasion-resistant, *mold-formed* coating intimately bonded to said substrate, said coating providing essentially exactly an optical surface [of desired configuration] *that is the positive replicate of a lens mold*, said coating comprising the polymerization product of a composition containing [reactive] ethylenically unsaturated groups *capable of reaction when exposed to heat or activating radiation* wherein said coating exhibits an adhesion of at least 90% to said substrate when tested according to ASTM D-3359.

10. A curved ophthalmic lens for correction of vision comprising an optically clear, solid room temperature stable substrate bearing an aberration-free coating which provides an optical surface which comprises essentially exactly the positive replicate of a lens mold and which has an SEB abrasion resistance of at least [20] *40* psi, which coating comprises the polymerization product of a composition containing reactive ethylenically unsaturated groups, and which has an adhesion of at least 90% to said substrate when tested according to ASTM D-3359.

*12. A curved ophthalmic lens for correction of vision comprising an optically clear, solid, room temperature stable substrate bearing a mold-formed aberration-free coating which provides an optical surface which comprises essentially exactly the positive replicate of a lens mold and which has an SEB abrasion resistance of at least 40 psi, which coating comprises the polymerization product of a composition containing ethylenically unsaturated groups capable of reaction when exposed to heat or activating radiation, and which has an adhesion of at least 90% to said substrate when tested according to ASTM D-3359.*

*13. A lens according to claim 1, 10, or 12 which has an SEB abrasion resistance of at least 60 psi.*

*14. A lens according to claim 1 or 12 wherein said mold-formed coating has a thickness of from about 2 microns to about 10 microns.*

* * * * *